United States Patent [19]

Grsetic

[11] Patent Number: 4,805,406
[45] Date of Patent: Feb. 21, 1989

[54] AIR ACTIVATED LIQUID DISPLACEMENT MOTOR

[76] Inventor: Zlatan Grsetic, 574 Oakwood La., Paradise, Calif. 95969

[21] Appl. No.: 212,006

[22] Filed: Jun. 27, 1988

[51] Int. Cl.4 .............................................. F03G 7/00
[52] U.S. Cl. ...................................................... 60/496
[58] Field of Search ........................................... 60/496

[56] References Cited

U.S. PATENT DOCUMENTS

| | | | |
|---|---|---|---|
| 2,135,110 | 11/1938 | Platt | 60/496 |
| 4,242,868 | 1/1981 | Smith | 60/496 |
| 4,498,294 | 2/1985 | Everett | 60/496 |

Primary Examiner—Allen M. Ostrager

[57] ABSTRACT

The invention provides an air activated displacement motor functional in a liquid medium. A plurality of air collectors are rotatably attached to a continuous support chain which rotates a power output shaft. Air is supplied into each air collector either by natural means or by an air compressor. The air is introduced into a receiver chamber which collects and distributes air through a series of air funnels located on a rotating conveyor belt. The conveyor belt is synchronized to rotate at the same speed as the support chain thereby aligning each air collector with an air funnel. The natural buoyancy of the air causes the air collectors to rise in the water pulling the support chain along with them. The continuous support chain is suspended in a vertically inclined L-shaped framework and moves along a right triangular path. The air filled air collectors move up vertically along the stem of the L. Once each air collector reaches the L frame top at the apex of the right triangular path, it is inverted, releases the air, and is drawn back down the angled chain to the base where the process begins again.

11 Claims, 3 Drawing Sheets

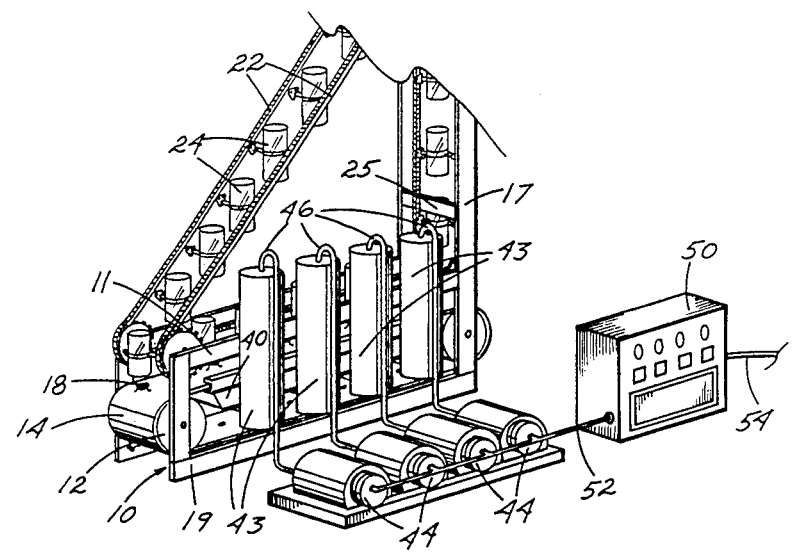
Fig. 5
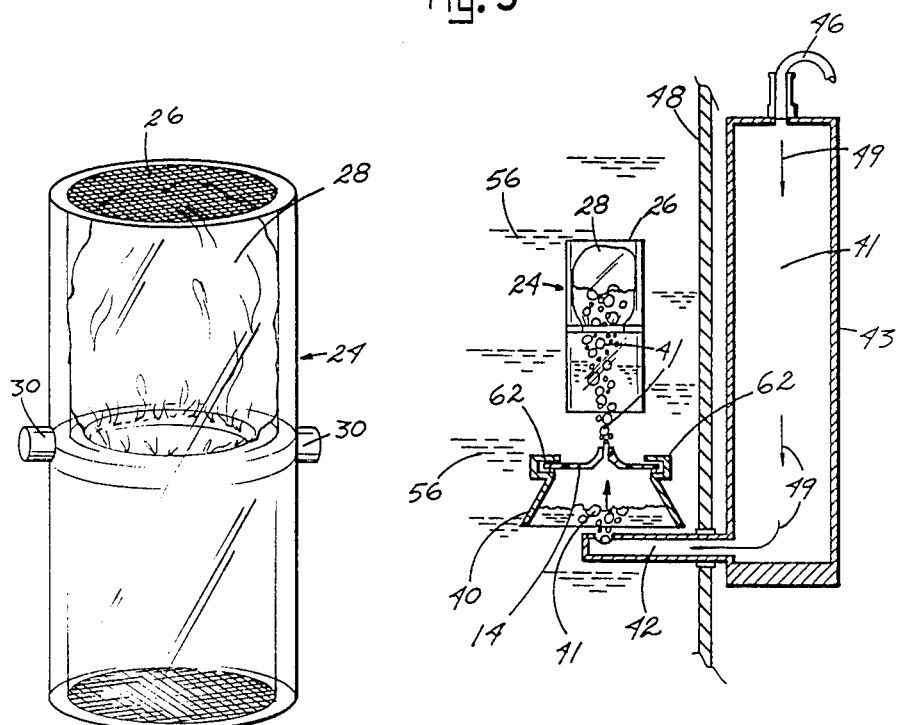
Fig. 6
Fig. 7

AIR ACTIVATED LIQUID DISPLACEMENT MOTOR

BACKGROUND OF THE INVENTION

1. Field of the Invention

This invention relates to air activated motors in general and more specifically to a motor submerged in a liquid, operational through displacement of liquid by air to rotate a power output drive shaft.

2. Description of the Prior Art

Pneumatic motors in general require considerable pressure and energy to run them. In my invention, I use a low pressure system with air displacing water in a submerged elevator structure to produce motion in a drive shaft. A practical application of my invention is to use the unharnessed energy originating from geothermal air vents located on the ocean floor to operate my device. Several well known locations exist where hot air vents beneath the ocean release massive quantities of air and gases. These hot air vents have remained virtually untapped as an alternate energy source because submergible motors capable of converting this released hot air to energy were unavailable. The principal set forth in the following specification describing my invention is ideally suited for utilizing this free energy and converting it into a form useful to mankind.

SUMMARY OF THE INVENTION

In practicing my invention, I have provided a mechanical hydraulic motor using air as the energy source to rotate a power output shaft. The air is captured in a series of tubular air collectors which are pivotally attached to a support chain. The support chain is movably affixed to chain gears fastened by axles to an L-shaped framework. The support chain follows a right triangular path moving horizontally along the base of the L and angling upwardly to the apex of the triangle at the top of the L stem. Once filled with air, the air collectors moving vertically up the stem section of the L rise to the surface of the water pulling the support chain along with them and rotating a power output shaft in the process. Each air collector is arranged on the support chain to invert at the apex of a triangular path where it releases the air and then, angling downwardly, returns to the bottom of the enclosed tank to repeat the process. The present invention can be manufactured in various sizes ranging from table top models to building size structures. It can also be designed for submergence in a pool, a lake, the ocean, and the like, or a separate hydraulic tank can be provided to house just the air displacement mechanisms.

Therefore, it is a primary object of my invention to provide an air activated displacement motor.

A further object of my invention is to provide an air activated displacement motor which can be completely submerged in a large body of water such as the ocean.

An even further object of my invention is to provide an air activated displacement motor which can be used on land in a tank with water covering the working mechanisms and having the air reservoir tanks, the air compressors, and the motor control center outside the tank.

A still further object of my invention is to provide an air activated displacement motor which can utilize energy from the natural hot air vents found both on land and along the ocean floor.

Other objects and the many advantages of the present invention will become apparent with a reading of the following specification and subsequent comparison of the numbered parts described with like numbered parts illustrated in the accompanying drawings.

BRIEF DESCRIPTION OF THE DRAWINGS

FIG. 5 is a perspective view illustrating the air reservoir tanks and the air compressors with the motor control center shown positioned to the right of the hydraulic mechanism.

FIG. 6 is an enlarged view of one open ended air collector illustrating the screen covering the open ends and the internal flexible air bag.

FIG. 7 is a sectional view of the hydraulic tank illustrating the air reservoir tanks directing air into the conveyor air receiver chamber where it is released into the air collector through funnel shaped apertures in the apertured conveyor belt.

DRAWING REFERENCE NUMBERS

Figure 1:
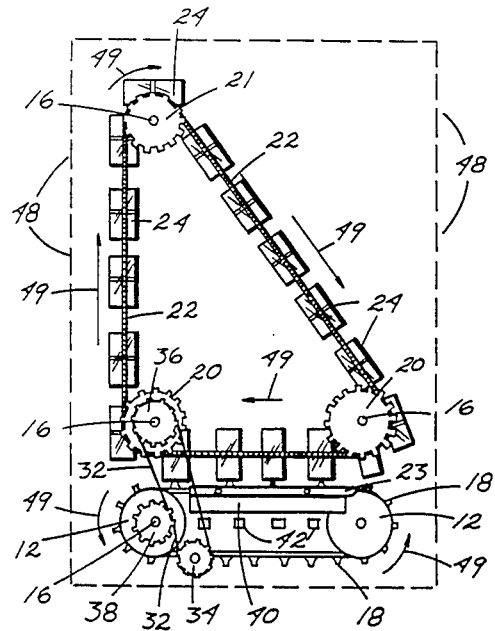
FIG. 1 is a side view of the hydraulic mechanism illustrating the principal operational parts of the present invention in submergence with the tank shown by dotted lines. The drum supported apertured belt air conveyor, the air collector support chain, the open ended air collectors, and the gearing mechanics are shown assembled.

10 L-shaped framework
11 horizontal superstructure member
12 conveyor drums
13 air receiver chamber mounts
14 apertured conveyor belt
15 main vertical support member
16 axle
17 superstructure vertical support member
18 air funnels
19 horizontal base member
20 lower chain gears
21 upper chain gears
22 air collector support chain
23 air receiver chamber extension
24 air collector
25 cross braces
26 screen
28 flexible air bag
30 air collector axles
32 timing chain
34 idler gear
36 support chain timing gear
38 conveyor timing gear
40 conveyor air receiver chamber
41 air
42 air reservoir output line
43 air reservoir tanks 44 air compressor
46 air reservoir input lines
48 hydraulic tank
49 direction of movement arrows
50 motor control center
52 electric lines
54 electric power input
56 water
58 water inlet
60 water outlet
62 air chamber belt guides
64 power output shaft
66 pulley

DESCRIPTION OF THE PREFERRED EMBODIMENT

Figure 2:
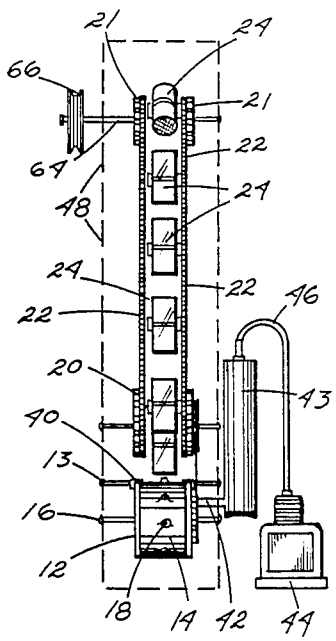
FIG. 2 is a front end view of the hydraulic mechanism with the dotted outline representing the hydraulic tank. The air reservoir tanks are shown attached to the right side of the hydraulic tank and are illustrated connected to an air compressor. The power output shaft is shown on the left with the pulley attached.
Figure 3:
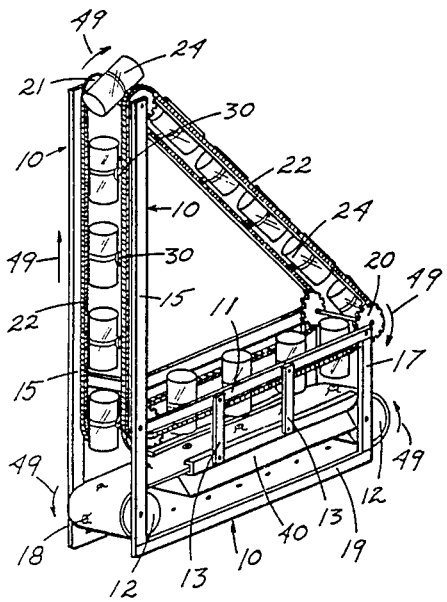
FIG. 3 is a perspective view of the hydraulic mechanism attached to an L-shaped support frame.
Figure 4:
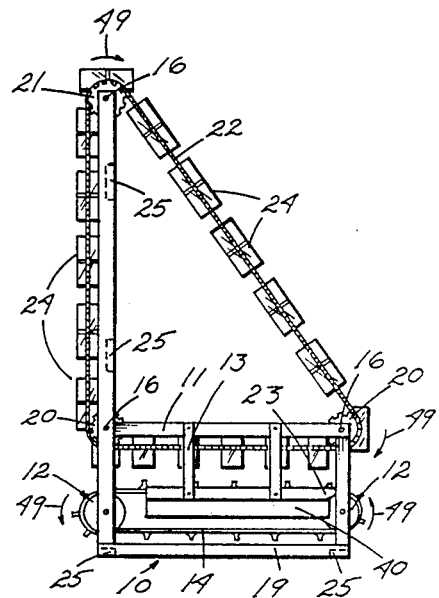
FIG. 4 is a side view of the hydraulic mechanism shown attached to the L-shaped support frame.
Figure 8:
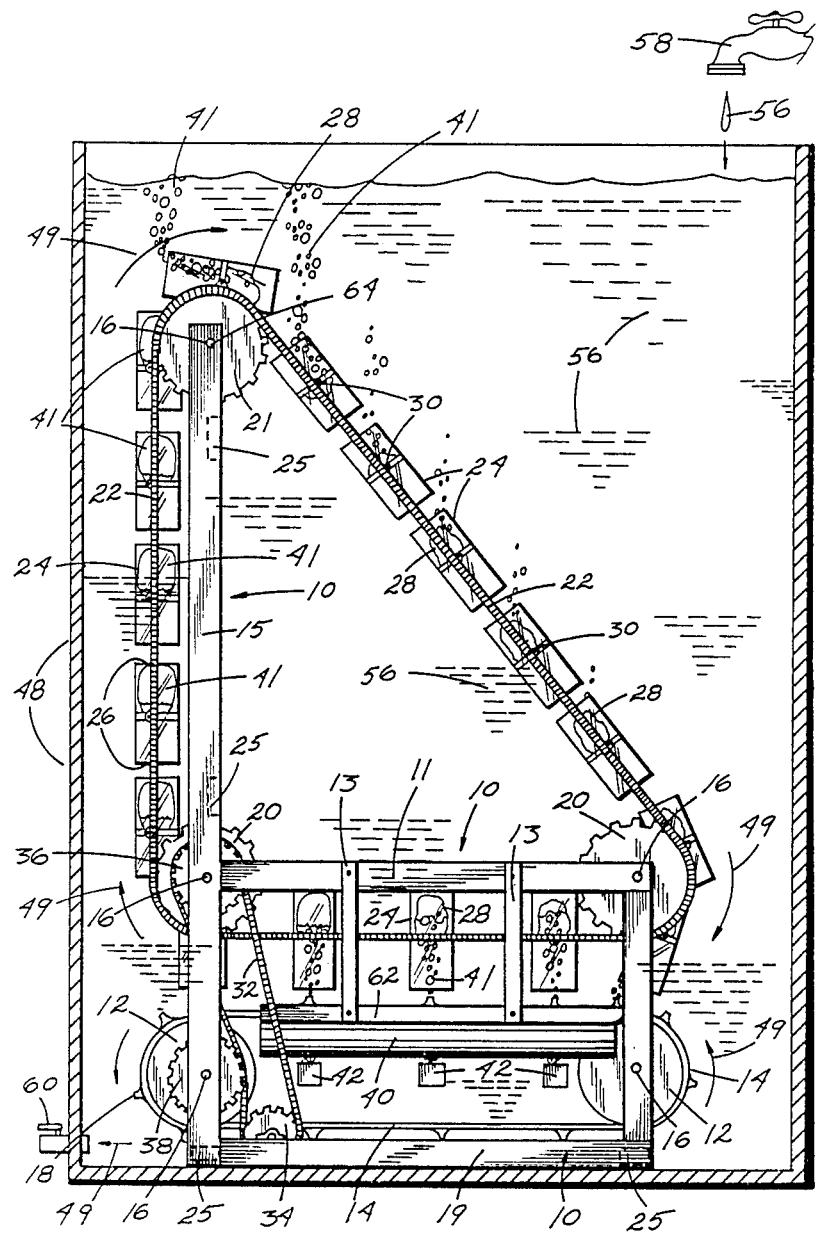
FIG. 8 is a side view of the hydraulic mechanism in use attached to the L-shaped support frame submerged in water in the hydraulic tank.

Referring now to the drawings where the operational mechanics of the preferred embodiment is illustrated. The air activated displacement motor has a mounting stand consisting of two paralleling sections designated L-shaped framework 10 which forms the support for two conveyor drums 12, four lower chain gears 20, and two upper chain gears 21, best seen in FIGS. 3 and 4. L-shaped framework 10 is structured of two parallel frame members attached by cross braces 25 and right angled to form the vertically aligned main vertical support member 15 and the horizontally aligned horizontal base member 19. It is to be noted that the vertical alignment of main vertical support member 15 and the horizontal alignment of horizontal base member 19 is critical and must be maintained in this position for proper operation of the assembled displacement motor hereinafter described. A horizontal superstructure member 11 attached above horizontal base member 19 to main vertical support member 15 approximately one fourth the vertical length of main vertical support member 15 is supported at the toe end of L-shaped framework 10 by superstructure vertical support member 17. Each of the conveyor drums 12 is cylindrical and endwardly attached by axle 16, one to main vertical support member 15 and one to superstructure vertical support member 17 between the horizontal superstructure member 11 and the lower horizontal base member 19 of L-shaped framework 10. The L-shape structure of L-shaped framework 10 is illustrated in FIGS. 3, 4, and 8. Main vertical support member 15 extends upwards approximately three times longer than the distance between where horizontal superstructure member 11 attached to main vertical support member 15 and where horizontal base member 19 attaches. The attachments of the various frame members are flush which can be accomplished by the method of manufacturing L-shaped framework 10 or by welding. Apertured conveyor belt 14 is positioned horizontally between horizontal superstructure member 11 and horizontal base member 19 of L-shaped framework 10 and is supported in place by conveyor drums 12. Conveyor drums 12 are attached by axle 16 as previously described to provide a horizontally aligned continuous path for apertured conveyor belt 14. A substantially rectangular inverted V-shaped conveyor air receiver chamber 40 is affixed longitudinally paralleling horizontal base member 19 supported by air receiver chamber mounts 13. The upwardly section of apertured conveyor belt 14 passes through and is retained in operational position by air chamber belt guides 62. Apertured conveyor belt 14 has an alignment of centrally spaced apertures protruding outwardly formed into air funnels 18. These apertures with funneled edges are equally spaced along the center of apertured conveyor belt 14, as seen in FIGS. 1 to 5. Directly above each conveyor drum 12 is positioned two lower chain gears 20 which are also supported by axle 16, best seen in FIG. 1. FIGS. 1 and 2 illustrate the mechanics of the device as it could be mounted for use in a hydraulic tank 48 with the walls of hydraulic tank 48 replacing L-shaped framework 10. FIGS. 1 and 2, with L-shaped framework 10 remove best shows the operational parts of the device. Upper chain gears 21 are located directly above the left lower chain gears 20. All three sets of lower chain gears 20 and upper chain gears 21 movably retain two parallel sections of air collector support chains 22 in a right triangle configuration, as seen in FIGS. 1, 3 and 4. Suspended between the two air collector support chains 22 are a multiple of air collectors 24. Each air collector 24 is an open ended cylinder which is protected by screen 26 covering each opened end and internally houses flexible air bag 28, best shown in FIG. 6. Screen 26 allows the passage of air 41 into flexible air bag 28 from either end yet prevents the passage of debris. Air collector axles 30 are located along either exterior lengthwise side of air collector 24 and serve to rotatably support air collector 24 attached between the air collector support chains 22. Timing chain 32 is connected on the lower left end to idler gear 34, which is adjustably attached to L-shaped framework 10, and on the upper end to support chain timing gear 36, best seen in FIG. 1. Support chain timing gear 36 is affixed on the outside surface of one left lower chain gear 20, as illustrated in the drawings. Abutting timing chain 32 on the left edge is conveyor timing gear 38 which is attached to the outside surface of left conveyor drum 12. Located between the two parallel horizontal sections of apertured conveyor belt 14 is conveyor air receiver chamber 40 which is designed to house and direct air 41 into air funnels 18, shown in FIGS. 3, 4 and 7. In hydraulic tank 48 without L-shaped framework 10, all support members and axles are affixed to the side walls of hydraulic tank 48 as illustrated in FIGS. 1 and 2. The mechanics of the present invention are operational inside hydraulic tank 48 assembled as described in L-shaped framework 10 or using the side walls of hydraulic tank 48 as a supporting structure in place of L-shaped framework 10. Air 41 is supplied to conveyor air receiver chamber 40 through air reservoir output line 42 which is connected to air reservoir tanks 43, best seen in FIG. 7. Air reservoir tanks 43 are kept at a constant pressure by air compressors 44, via air reservoir input lines 46, which are located outside hydraulic tank 48, as shown in FIG. 8. Air compressors 44 are regulated by motor control center 50, via electric lines 52. Motor control center 50 is electrically powered through electric power input 54, as seen in FIG. 5.

Although the present invention is easily modified for a variety of submergences, pools, lakes, oceans, and the like, it is described operationally in a tank, hydraulic tank 48, herein. In tank operation, all portions of the device except air reservoir tanks 43, air compressors 44, and motor control center 50 are placed inside hydraulic tank 48. Hydraulic tank 48 is then filled with water 56 from water inlet 58 with any excess water 56 being released via water outlet 60 which is also the drain spigot. Air compressor 40 then injects air 41 into air reservoir tanks 43 through air reservoir input lines 46. Air reservoir tanks 43 are used to maintain a certain degree of air pressure. Air 41 is then forced into air reservoir output line 42 where it is released for the first time into water 56. Air 41 then rises through water 56 and collects under conveyor air receiver chamber 40. Conveyor air receiver chamber 40 is an inverted V-shaped rectangular housing having upwardly beveled sides with vertical end walls and an opened bottom and top section. The opened top side edges of conveyor air receiver chamber 40 have opposing edges structured into sideways positioned U-shaped air chamber belt guides 62 which serve as air sealing overlapping flanges covering a section of the lengthwise side edges of apertured conveyor belt 14. U-shaped air chamber belt guides 62 act as belt positioning guides and as a barrier to reduce the amount of air 41 which inadvertently escapes from conveyor air receiver chamber 40. As the assembled device is submerged or water 56 is added to hydraulic tank 48, air collector support chain 22 will begin to move as indicated by direction of movement arrows 49 pulled upwardly by air 41 trapped in air collectors 24. Once apertured conveyor belt 14 begins rotating, air funnels 18 are synchronized in speed to be located directly under each passing air collector 24 by the action of timing chain 32. As each air collector 24 passes horizontally above each air funnel 18, air 41 is released into the interior into flexible air bag 28. A right hand (as illustrated in FIGS. 1, 3, 4, and 8) air receiver chamber extension 23 to conveyor air receiver chamber 40 starts charging the first air collector 24 as it angles downwardly around the right hand pair of lower chain gears 20 to commence the process of positioning the air collectors 24 vertically above apertured conveyor belt 14. By the time each air collector 24 has reached the left edge of the horizontal section of L-shaped framework 10 each flexible air bag 28 has received a specific volume of air 41 which now begins to lift each air collector 24 vertically aligned up along the left side lower chain gears 20 towards the surface of water 56. As air collectors 24 rise, air collector support chains 22 are lifted also, rotating upper chain gear 21. Axle 16 of upper chain gear 21 projects outside hydraulic tank 48 and forms power output shaft 64. Power output shaft 64, which rotates with upper chain gear 21, is affixed on the end with pulley 66. Pulley 66 can be used to power a variety of mechanical devices. As each air collector 24 reaches the apex of L-shaped framework 10 it is inverted as it passes over the axle 16 of upper chain gear 21 and releases air 41. When air 41 is released, flexible air bag 28 is inverted and subsequently fills with water 56 and is angled back down to the base of L-shaped framework 10. The resistance offered by water 56 inside water filled flexible air bag 28 maintains air collector 24 in angled parallel alignment with air collector support chains 22 during downward movement. When each air collector 24 reaches the right lower chain gear 20 it is slightly rotated and arranged roughly in a vertical position. Air passed through air funnel 18 moving through air receiver chamber extension 23 straightens each first arriving air collector 24 to a more vertical position. As each air collector 24 passes over apertured conveyor belt 14 it is aligned with one air funnel 18. Air 41 passing through air funnel 18 enters the bottom of one air collector 24 where it begins filling flexible air bag 28. If air collector 24 is not completely vertical at this time, the force of air 41, which is introduced into flexible air bag 28 as it moves along above apertured conveyor belt 14, will position air collector 24 in an upright position before it reaches the vertical section of L-shaped framework 10, best seen in FIG. 8, where the cycle begins again.

Although I have described my invention in detail in the specification, it is to be understood that I may practice modifications in the structure and design of the invention insofar as all changes remain within the scope of the appended claims.

What I claim as my invention is:

1. An air activated liquid displacement motor, comprising:
   a double membered L-shaped framework formed of an elongated vertically inclined portion, a horizontally inclined base portion, a horizontally inclined superstructure portion affixed downwardly in parallel alignment with said base portion to said vertically inclined portion and to superstructure vertical support members affixed to the distal ends of said base portion, said dual members of said L-shaped framework affixed one to the other by horizontally inclined cross bracing;
   dual continuous chains arranged on chain gears to move along a vertically inclined paralleling right triangular path in said L-shaped framework;
   a multiple of open ended tubular air collectors attached between said dual continuous chains in a manner to reverse ends at the apex position of said right triangular path;
   water and air proofed flexible air bags having an opened end attached centrally circumferentially inside said tubular air collectors with the length of said bags somewhat less than half the length of said tubular air collectors and having the bag portion and the closed end thereof free to reposition into either half of said tubular air collectors;
   screening covering both openings of said open ended tubular air collectors, said screening sized to prevent debris from entering said tubular air collectors;
   an air receiver chamber rectangularly configured horizontally mounted longitudinally paralleling said horizontal base leg of said L-shaped framework attached upwardly to said horizontally aligned superstructure member of said horizontal base, said air receiver chamber widened and opened longitudinally downwardly and opened longitudinally upwardly with the upwardly edges affixed oppositely with horizontally aligned paralleling retainer belt guides;
   an apertured belt continuously mounted below said air receiver chamber on drums affixed by axles to vertical end members of said L-shaped framework, said apertured belt, the apertures therein, having protruding funnel shaped edges and the upwardly portion of said belt arranged to pass through said air receiver chamber retainer belt guides;
   means for air supply;
   means for air reserving;
   means to captively distribute air from said air supply source through said air reserving means into said air receiver chamber;
   means for positioning said air collectors vertically for horizontal movement adjacently above said apertured conveyor belt;
   means for coordinating said air collectors vertically positioned properly aligned in said duel continuous chains with said apertures and said protruding funnel shaped ends in said apertured belt for air passage from said upwardly opened air receiver chamber through said apertures in said apertured conveyor belt upwardly into said opened ends of said collectors;

means for power output;

means for containment of sufficient water for total submersion of said double membered L-shaped framework in operational assemblage.

2. The motor of claim 1 wherein said means for air supply is one or more electrically powered air compressors with controls and electrical connections.

3. The motor of claim 1 wherein said means for air reserving is one or more elongated tubular air reservoir tanks longitudinally vertically positioned attached adjacent said air receiver chamber to said horizontally aligned superstructure member of said horizontal base.

4. The motor of claim 1 wherein said means to captively distribute air from said air supply source through said air receiving means into said air receiver chamber is a series of tubular air connections from said air supply source affixed to the top of said air reserving means and affixed from the bottom of said air reserving means to opened terminal ends positioned centrally directly under said air receiver chamber providing an opened air passageway from said air supply source to said air receiver chamber.

5. The motor of claim 1 wherein said means for positioning said air collectors vertically for horizontal movement adjacently above said apertured conveyor belt is air passed through a first air funnel moved through an air receiver chamber extension to straighten each first arriving air collector to a more vertical position and the addition of said air into said air collectors as they move horizontally along above said air supplying funnels.

6. The motor of claim 1 wherein said means for coordinating said air collectors vertically positioned properly aligned in said duel continuous chains with said protruding funnel shaped ends of said apertures in said apertured belt for air passage from said upwardly opened air receiver chamber through said apertures in said apertured conveyor belt upwardly into said opened ends of said collectors is a support chain timing gear affixed downwardly to one of said chain gears arranged to move said continuous dual chains and a conveyor timing gear affixed to one of said apertured conveyor belt drums at the end thereof immediately under said conveyor timing gear and adjacent to an idler gear with said support chain timing gear, said conveyor timing gear, and said idler connected by a continuous chain in a manner to coordinate movement in said dual continuous chains with movement in said apertured conveyor belt.

7. The motor of claim 1 wherein said means for power output is a power output shaft extension of the axle affixing said dual chain gears to said L-shaped framework at said apex of said right triangular chain movement path with said power output shaft fitted at the outer end with a pulley-type drive wheel.

8. The motor of claim 1 wherein said means for containment of sufficient water for total submersion of said double membered L-shaped framework in operational assemblage includes a rectangular tank sufficiently sized for complete submersion of said L-shaped framework in operational assemblage with said tank having an opened top and plumbing arrangements for both filling said tank with water and draining water from said tank.

9. The tank of claim 8 wherein the sidewalls of said tank replace the attachment structure of said L-shaped framework.

10. The motor of claim 1 wherein said means for containment of sufficient water for total submersion of said double membered L-shaped framework in operational assemblage includes naturally contained and artificially contained bodies of water with said bodies of water including pools, rivers, lakes, seas, oceans, and the like.

11. The motor of claim 1 wherein said means for air supply shall further include pressurized geothermal emissions both oceanic and terrainic.

* * * * *